US009562821B2

(12) United States Patent
Chou (10) Patent No.: US 9,562,821 B2
(45) Date of Patent: *Feb. 7, 2017

(54) PRESSURE INDICATOR FOR AIR COMPRESSOR

(71) Applicant: Wen-San Chou, Tainan (TW)

(72) Inventor: Wen-San Chou, Tainan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/850,580

(22) Filed: Sep. 10, 2015

(65) Prior Publication Data

US 2016/0076963 A1  Mar. 17, 2016

(30) Foreign Application Priority Data

Sep. 15, 2014 (TW) ............................. 103131824 A (51) Int. Cl.
| | |
|---|---|
| *G01L 7/00* | (2006.01) |
| *G01L 19/10* | (2006.01) |
| *F04B 35/01* | (2006.01) |
| *F04B 35/04* | (2006.01) |
| *F04B 39/12* | (2006.01) |
| *F04B 49/08* | (2006.01) |
| *F04B 49/10* | (2006.01) |
| *G01L 7/16* | (2006.01) |

(52) U.S. Cl.
CPC .............. *G01L 19/10* (2013.01); *F04B 35/01* (2013.01); *F04B 35/04* (2013.01); *F04B 39/12* (2013.01); *F04B 39/121* (2013.01); *F04B 49/08* (2013.01); *F04B 49/10* (2013.01); *G01L 7/163* (2013.01); *G01L 7/166* (2013.01)

(58) Field of Classification Search
CPC ......... G01L 19/0007; G01L 7/00; G01N 3/12; E21B 49/10; E21B 47/00
USPC ... 73/756, 700, 37, 152.27, 152.01; 285/158
See application file for complete search history.

(56) References Cited

U.S. PATENT DOCUMENTS

| | | | | | |
|---|---|---|---|---|---|
| 3,779,081 | A | * | 12/1973 | Holtzman | ................. G01L 7/16 73/114.18 |
| 7,047,812 | B2 | * | 5/2006 | Itou | ......................... G01L 7/166 73/714 |
| 2016/0097383 | A1 | * | 4/2016 | Chou | ...................... F04B 35/00 417/63 |

* cited by examiner

*Primary Examiner* — Lisa Caputo
*Assistant Examiner* — Nigel Plumb (57) ABSTRACT

A pressure indicator, which can be detachably connected to an air compressor for measuring the pressure of compressed air produced in the air compressor, includes a tube and a slider. The slider can be moved along a first bore and a second bore of the tube. The motion of the slider in the tube is similar to the motion of a piston body in a cylinder. The tube is provided with a tapered annular surface, between the first bore and the second bore, and defines an elongated opening. In addition, when the pressure of the compressed air exceeds a predetermined pressure, excessive air can be released into the ambient environment, without using a mechanical safety valve, so that an object can be prevented from over-inflation.

7 Claims, 9 Drawing Sheets

PRESSURE INDICATOR FOR AIR COMPRESSOR

(a) TECHNICAL FIELD OF THE INVENTION

The present invention relates to a pressure indicator and, more particularly, to a pressure indicator that can be detachably connected to an air compressor for measuring the pressure of compressed air produced in the air compressor. In addition, when the pressure of the compressed air exceeds a predetermined pressure, excessive air can be released into the ambient environment, without using a mechanical safety valve, so that an object can be prevented from over-inflation.

(b) DESCRIPTION OF THE PRIOR ART

Conventionally, air compressors, especially the small air compressors being used for inflating objects such as tires and air cushions, are provided with two outlets at an air storage container, one of which is connected with a circular pressure gauge, and the other one of which is connected with a hose with an air nozzle by which an object, such as a tire, can be inflated. The circular pressure gauge can show the pressure of the compressed air within the air storage container for a user. According to the measured pressure, the user can operate the air compressor properly to inflate the object. Since the circular pressure gauge, which employs a Bourdon tube as a pressure sensor, contains precision components, when it falls to the ground or experiences a large impact, the pressure gauge is prone to be damaged and thus lose its accuracy. To overcome the disadvantage of the Bourdon-tube pressure gauges, a pressure display device, registered as Japan utility model 3185073, was disclosed, wherein the pressure display device generally includes a tube, an elongated bar, a spring, and a ruler. The pressure display device is featured in that the tube is provided with an air escaping hole at its surrounding wall. In use, the tube receives compressed air from an air compressor, so that a push block within the tube can be forced by the compressed air to move the elongated bar forward and compress the spring, so that the pressure of the compressed air can be measured. When the air pressure of the compressed air exceeds a predetermined pressure set for an object to be inflated, excessive air can be released into the ambient environment through the air escaping hole of the tube, so that the object can be prevented from over-inflation.

However, the pressure escaping hole is too small; it cannot release air effectively upon an instantaneous pressure surge of the compressed air. Besides, the pressure escaping hole is prone to be blocked by dust and dirt, so that the pressure releasing function is probably affected.

Furthermore, in the pressure display device, one end of the elongated bar is inserted into a locking groove of the push block and the other end of the elongated bar is inserted through a hole of a sleeve attached at the tube. The vibration of the air compressor will cause the elongated bar to be shifted from its normal position, which will in turn cause an oblique movement of the elongated bar, so that the friction between the elongated bar and the sleeve will be increased, and thus the hole of the sleeve will be enlarged. Consequently, the elongated bar is easy to vibrate and finally it may be removed from the push block A further disadvantage of the pressure display device is that the tube and the ruler will occupy a significant length.

In view of the foregoing, there is a need to develop a robust pressure indicator for an air compressor, which can accurately measure the pressure of air supply from the air compressor and effectively release excessive air into the ambient environment, without using a mechanical safety valve, when a high pressure occurs.

SUMMARY OF THE INVENTION

One object of the present invention is to provide a pressure indicator, which can be quickly connected to one outlet of an air storage container of an air compressor and quickly disconnected from the outlet. The pressure indicator can measure the pressure of compressed air produced in the air compressor.

According to one feature of the present invention, the pressure indicator includes a tube and a slider capable of moving along first and second bores of the tube, wherein the motion of the slider in the tube is similar to the motion of a piston body in a cylinder.

According to another feature of the present invention, the tube is provided with a tapered annular surface between the first and second bores thereof and defines an elongated opening. In addition to measuring the pressure of the compressed air produced in the air compressor, when the pressure of the compressed air exceeds a predetermined pressure, the pressure indicator can release air into the ambient environment via the elongated opening, without using a mechanical safety valve, so that an object can be prevented from over-inflation.

Other objects, advantages, and novel features of the present invention will become more apparent from the following detailed description when taken in conjunction with the accompanying drawings.

DETAILED DESCRIPTION OF THE PREFERRED EMBODIMENTS

Referring first to FIGS. 1, 2, 3 and 5, a pressure indicator according to one embodiment of present invention is shown, which comprises a tube 1 having a first segment 2 and a second segment 3. The second segment 3, which is adapted for connection to one outlet 92 of an air storage container 91 of an air compressor 9, defines therein a second bore 30. The first segment 2, which is formed integrally with the second segment 3, has an open end 21 opposite to the second segment 3 and defines therein a first bore 20 that communicates with the second bore 30, wherein the first bore 20 has a diameter greater than the second bore 30. As shown, a tapered annular surface 10 is formed between an inner surface of the first bore 20, which defines the first bore 20, and an inner surface of the second segment 3, which defines the second bore 30. The first segment 2 defines at its surrounding wall an elongated opening 23, with two opposing side rails 24, 25, extending from the tapered annular surface 10 to its open end 21. The tube 1 is provided at the open end 21 of the first segment 2 with external threads 22.

Figure 1:
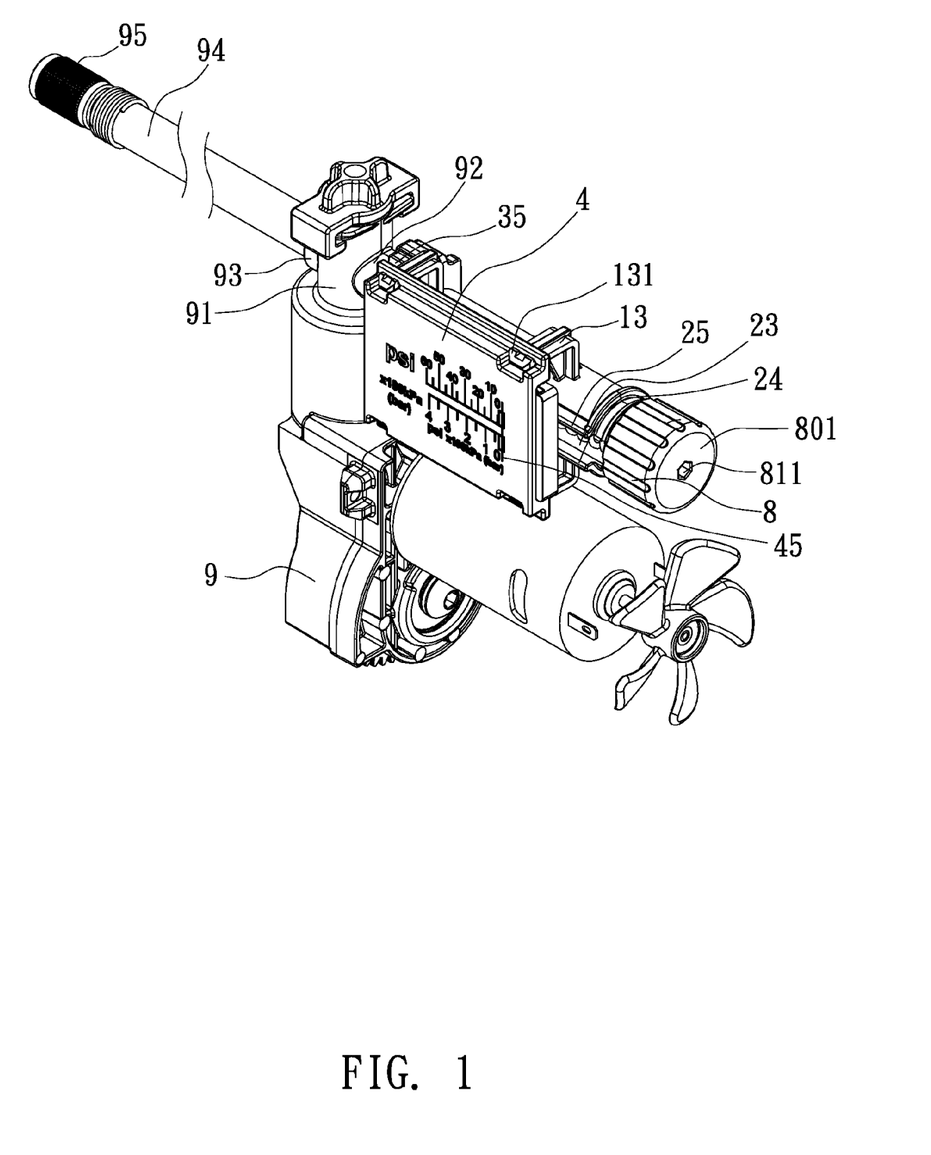
FIG. 1 shows a 3-dimensional view of a pressure indicator connected to an air compressor according to one embodiment of the present invention.
Figure 2:
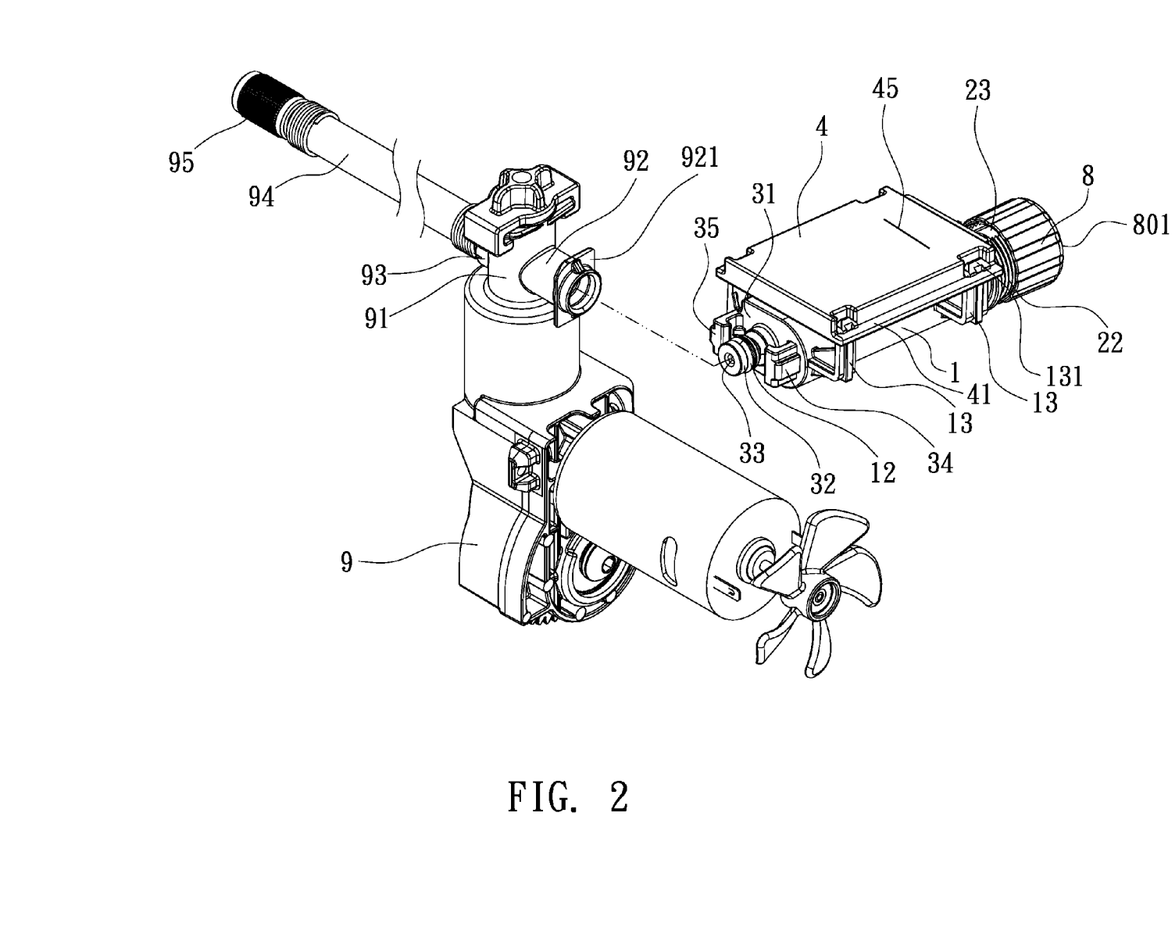
FIG. 2 shows a 3-dimensional view of the pressure indicator being disconnected from the air compressor.

The second segment 3 of the tube 1 is formed with an end wall 31 at one end opposite to the first segment 2 of the tube 1. The end wall 31 is provided with a connector 32 and a pair of connection hooks 34, 35 at two opposite sides of the connector 32, wherein the connector 32 is off-centered with the tube 1; namely, the connector 32 is not located at the central line of the tube 1. The connector 32 defines therethrough an air channel 33 communicating with the second bore 30 of the second segment 3 of the tube 1. The air channel 33 is composed of a small-diameter channel 331 and a large-diameter channel 332. Through the connection hooks 34, 35, the tube 1 can be connected to the outlet 92 of the air storage container 91 of the air compressor 9. The outlet 92 is provided with a flange 921. The connection hooks 34, 35 can be engaged with the flange 921 of the outlet 92 while connector 32 can be inserted into the outlet 92 by turning the tube 1 in a forward direction, so that the pressure indicator can be connected to the air compressor 9. The connection hooks 34, 35 can be disengaged from the flange 921 of the outlet 92 while the connector 32 can be removed from the outlet 92 by turning the tube 1 in a reverse direction, so that the pressure indicator can be disconnected from the air compressor 9. When the pressure indicator is connected to the air compressor 9, the connector 32 is inserted into the outlet 92 of the air storage container 91 of the air compressor 9, and thus the compressed air produced in the air compressor 9 can flow into the tube 1 via the air channel 33 of the connector 32. As shown in FIG. 1, another outlet 93 of the air storage container 91 can be connected with a hose 94 which contains at its end an air nozzle 95, through which an object can be inflated. Therefore, the compressed air produced in the air compressor 9 can be transferred to the object via the hose 94 and the air nozzle 95. In addition, the pressure indicator can measure the pressure of the compressed air produced in the air compressor 9.

Figure 3:
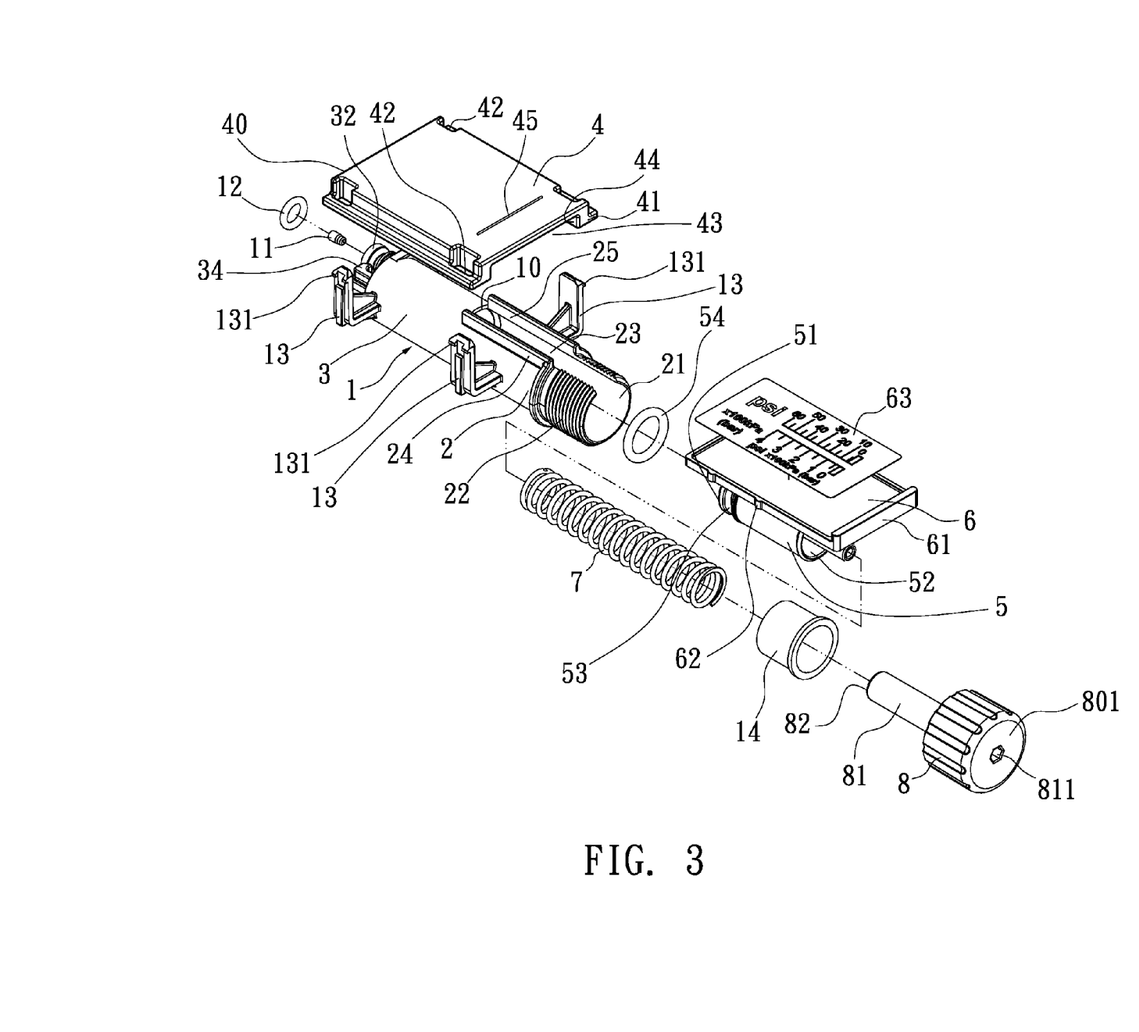
FIG. 3 shows an exploded view of the pressure indicator.
Figure 4:
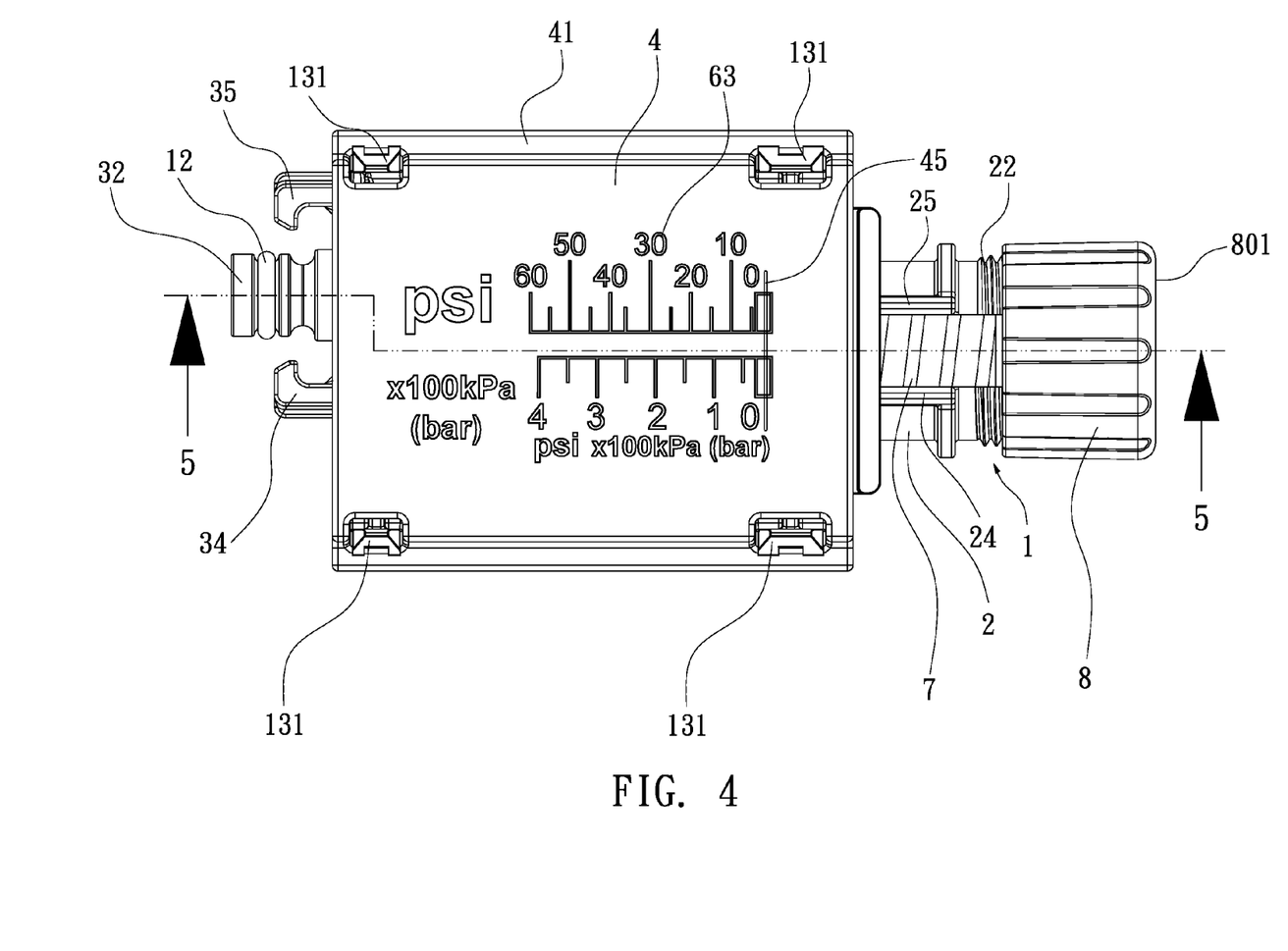
FIG. 4 shows a plan view of the pressure indicator, which is at its original position.

Referring to FIGS. 3 and 4, the tube 1 of the pressure indicator functions like a cylinder used in an air compressor. The tapered annular surface 10, which is a generally conic surface for connecting the two tube segments, has a large radius at its right and a small radius at its left. Although this embodiment provides the tapered annular surface 10, which extends outwardly with the central axis of the tube 1 in a linear path, a curved annular surface, which extends outwardly with the axis of the transparent tube 1 in a curved path, can be used as well. The first segment 2 of the tube 1 is provided with the external threads 22 at its open end 21. The second segment 3 of the tube 1 is formed with the end wall 31, the inner surface of which is provided with a plurality of spaced buffering pads 36 (see FIG. 5). Furthermore, the tube 1 is provided at its surrounding wall with four L-shaped fixing aims 13, each fixing aim being provided with a snap-fitting hook 131 at its end. The connector 32 is provided with an O-ring 12 at its outer surface and defines therethrough the air channel 33, which is composed of the small-diameter channel 331 and the large-diameter channel 332, wherein the small-diameter channel 331 is fitted with a buffering plug 11 to moderate instantaneous pressure surge of the compressed air transferred from the air compressor 9; the large-diameter channel 332 is adjacent to the second segment 3 of the tube 1.

The stationary transparent plate 4, which is a generally rectangular structure, has two side flanges 41 respectively at its top and bottom sides and defines a recessed space 43 at its back surface, between the two side flanges 41, wherein the recessed space 43 is parallel to the extending direction of the tube 1. The stationary transparent plate 4 defines at the side flanges 41 four openings 42, which can be inserted by the snap-fitting hooks 131 of the fixing arms 13, so that the stationary transparent plate 4 can be detachably fixed onto the tube 1. Furthermore, the stationary transparent plate 4 has a sidewall 40 at its left side and is provided with a marking line 45 thereon.

The slider 5 generally includes a hollow cylindrical body and a panel 6. The hollow cylindrical body, which has a closed end 51 and an open end 52, defines therein an inner space 50 that opens out at the open end 52. The cylindrical body of the slider 5 is provided with a central tube 56 that extends from an inner surface of its closed end 51, through its inner space 50, to go beyond the open end 52. The closed end 51 of the hollow cylindrical body of the slider 5 is formed with an inner step 57 around the central tube 56. The hollow cylindrical body of the slider 5 defines an annular groove 53 at its surrounding wall, near its closed end 51, to be fitted with an O-ring 54. As such, the compressed air from the air storage container 91 can force the slider 5 to move towards the open end 52 of the tube 1. The displacement of the slider 5 can reflect the pressure of the compressed air. The panel 6, being a generally rectangular structure, is joined to the hollow cylindrical body of the slider 5 through a neck portion 55 formed at the outer surface of the hollow cylindrical body, near the open end 52, such that the panel 6 is parallel to the hollow cylindrical body of the slider 5. Furthermore, the panel 6 has a sidewall 61 at its right side and is provided with a plurality of protrusions 62 on its top and bottom sides. The hollow cylindrical body of the slider 5 can be fitted into the bores 20, 30 of the tube 1, and the neck portion 55 can be inserted through the elongated opening 23. When the air compressor is stopped, the sidewall 40 of the stationary transparent plate 4 is adjacent to the left side of the panel 6, and the sidewall 61 of the panel 6 is adjacent to the right side of the stationary transparent plate 4. The protrusions 62 of the panel 6 are in contact with two opposing side surfaces 44 of the recessed space 43 to facilitate the panel 6 to move together with the hollow cylindrical body of the slider 5 along the recessed space 43 of the stationary transparent plate 4. Furthermore, the panel 6 is provided with a layer of pressure-indicating scale 63 at its outer surface.

Figure 5:
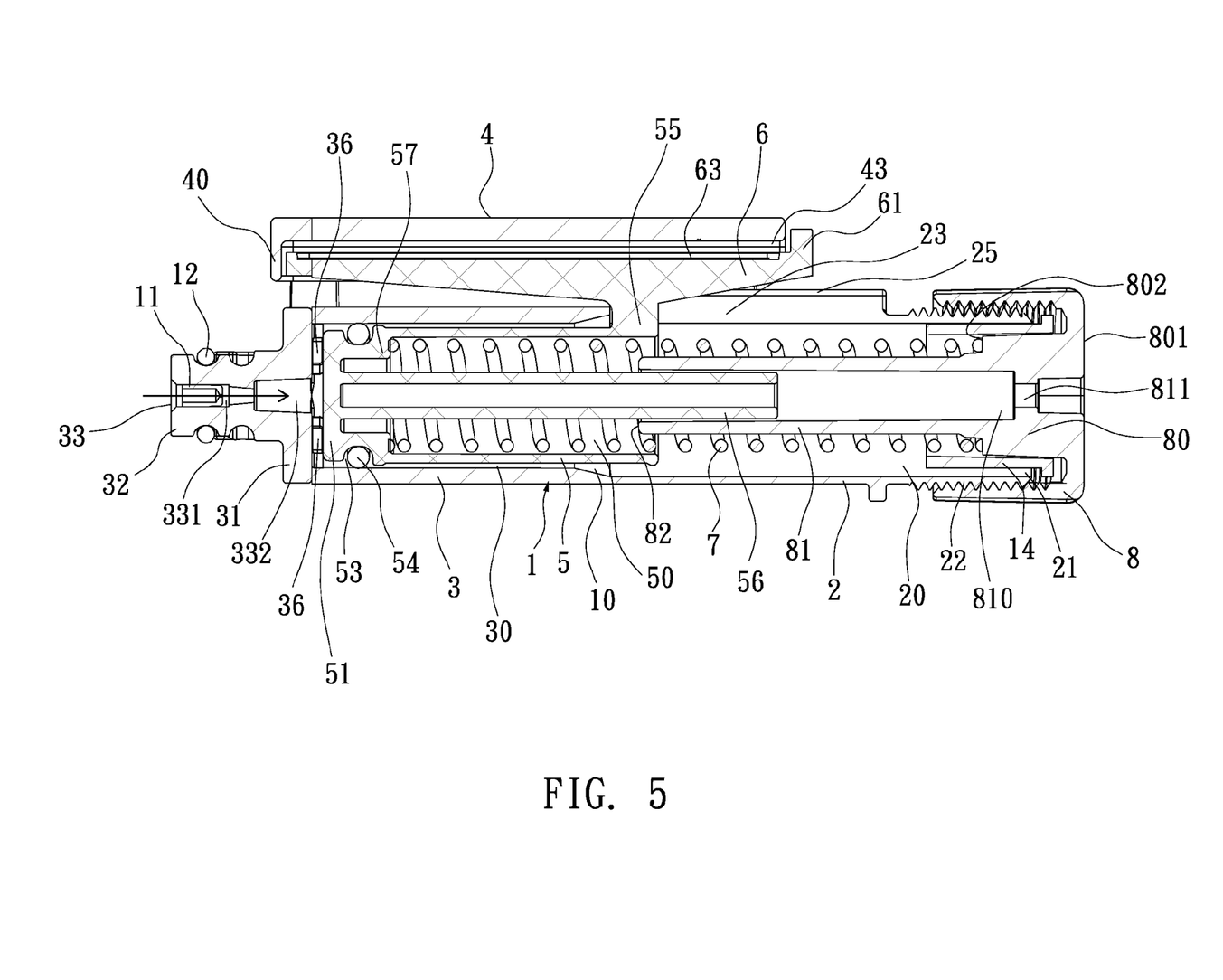
FIG. 5 shows a sectional view of the pressure indicator shown in FIG. 4.

The coiled compression spring 7 is fitted into the inner space 50 of the slider 5, around the central tube 56, wherein one end of the coiled compression spring 7 is urged against the inner step 57 of the closed end 51 of the slider 5, as shown in FIG. 5. The coiled compression spring 7 may slightly contact the inner surface that defines the inner space 50 of the slider 5. The slider 5 is received in the tube 1 and forced by the coiled compression spring 7, so that the slider 5 is urged against the buffering pads 36 provided on the inner surface of the end wall 31 of the tube 1. Since the air channel 33, being composed of the small-diameter channel 331 and the large-diameter channel 332, communicates with the inner spaces 20, 30 of the tube 1, the compressed air in the air storage container 91 can flow into the second bore 30 of the second segment 3 of the tube 1 via the air channel 33 to force the slider 5 to move along the second bore 30 and the first bore 20 towards the open end 21. The motion of the slider 5 in the tube 1 is similar to the motion of a piston body in a cylinder, as shown in FIGS. 3 through 7.

Referring to FIGS. 3, 4 and 5, the cap 8 has an inner base 80 and a central tube 81 extending from the inner base 80, wherein the central tube 81 has a diameter less than the inner base 80, thus forming an annular inner surface 802 therebetween. The central tube 81 defines therein a central hole 810 that opens out at an open end 82 of the central tube 81. The diameter of the central hole 810 of the central tube 81 of the cap 8 is greater the external diameter of the central tube 56 of the slider 5. The external diameter of the central tube 81 of the cap 8 is less than the internal diameter of the coiled compression spring 7. The sleeve 14 is fitted around the inner base 80 of the cap 8. When mounting the cap 8 to the tube 1, the central tube 81 of the cap 8 will receive the central tube 56 of the slider 5. The other end of the coiled compression spring 7 is inserted into the sleeve 14 and urged against the annular inner surface 802 between the inner base 80 and the central tube 81. The inner base 80 defines therein a vent 811, generally between the outer surface 801 and the annular inner surface 802, which communicates with the central hole 810 of the central tube 81. FIG. 1 shows the assembled pressure indicator of the present invention, which is obtained by assembling the tube 1, the stationary transparent plate 4, the slider 5, the coiled compression spring 7, the sleeve 14, and the cap 8.

Figure 6:
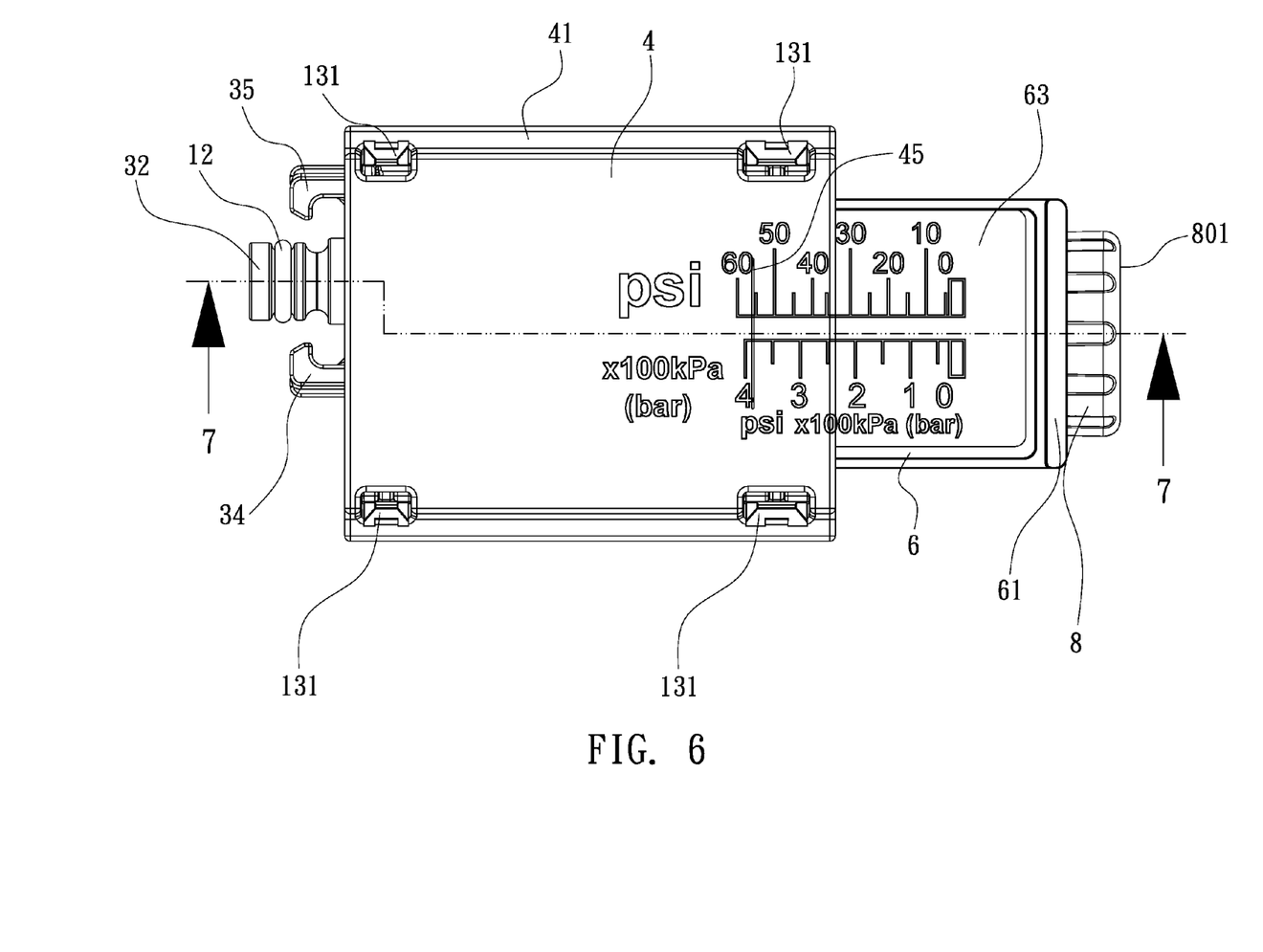
FIG. 6 shows a plan view of the pressure indicator, wherein the slider is forced by compressed air to move towards the open end of the tube.
Figure 7:
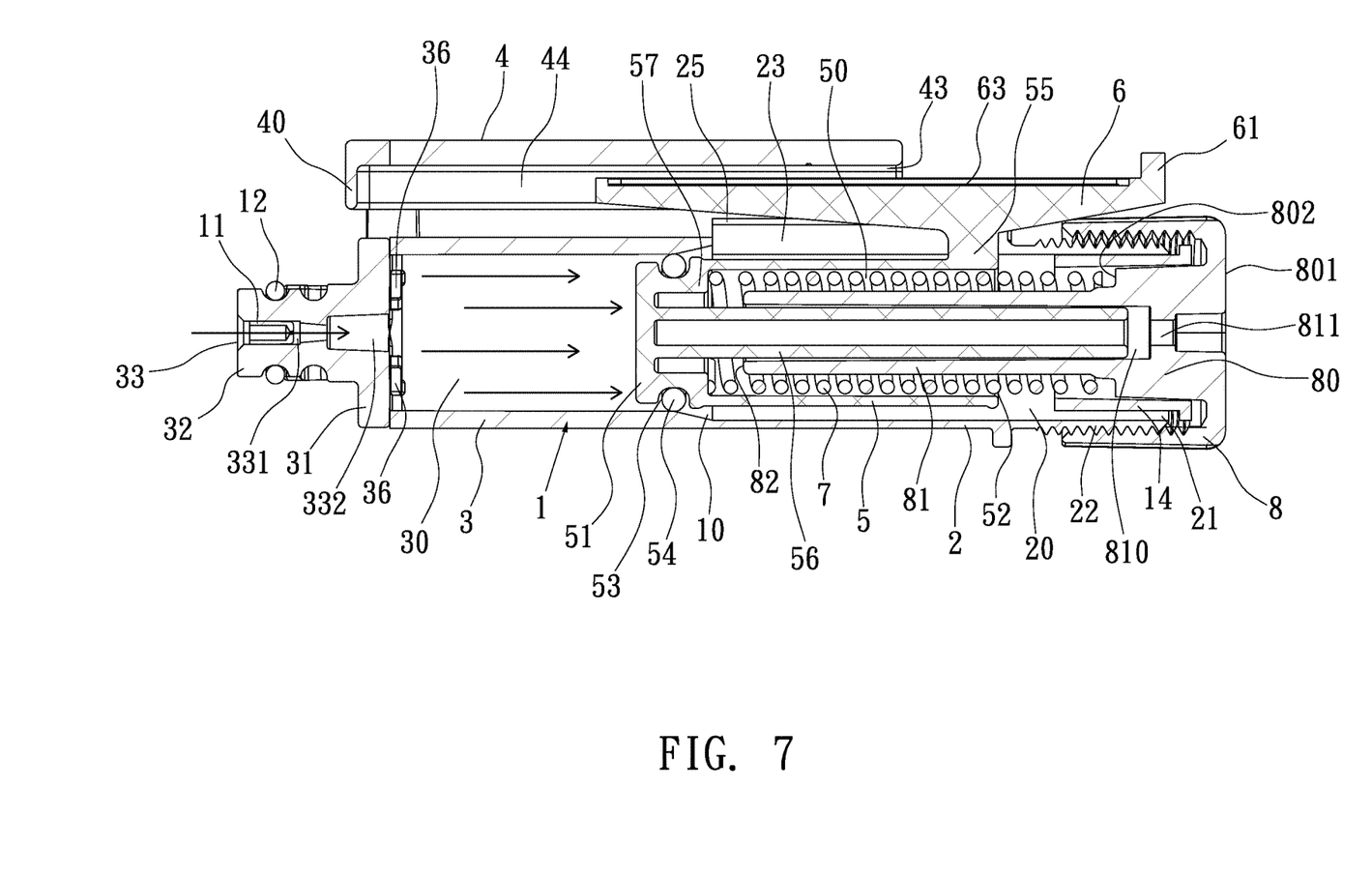
FIG. 7 shows a sectional view of the pressure indicator shown in FIG. 6.
Figure 8:
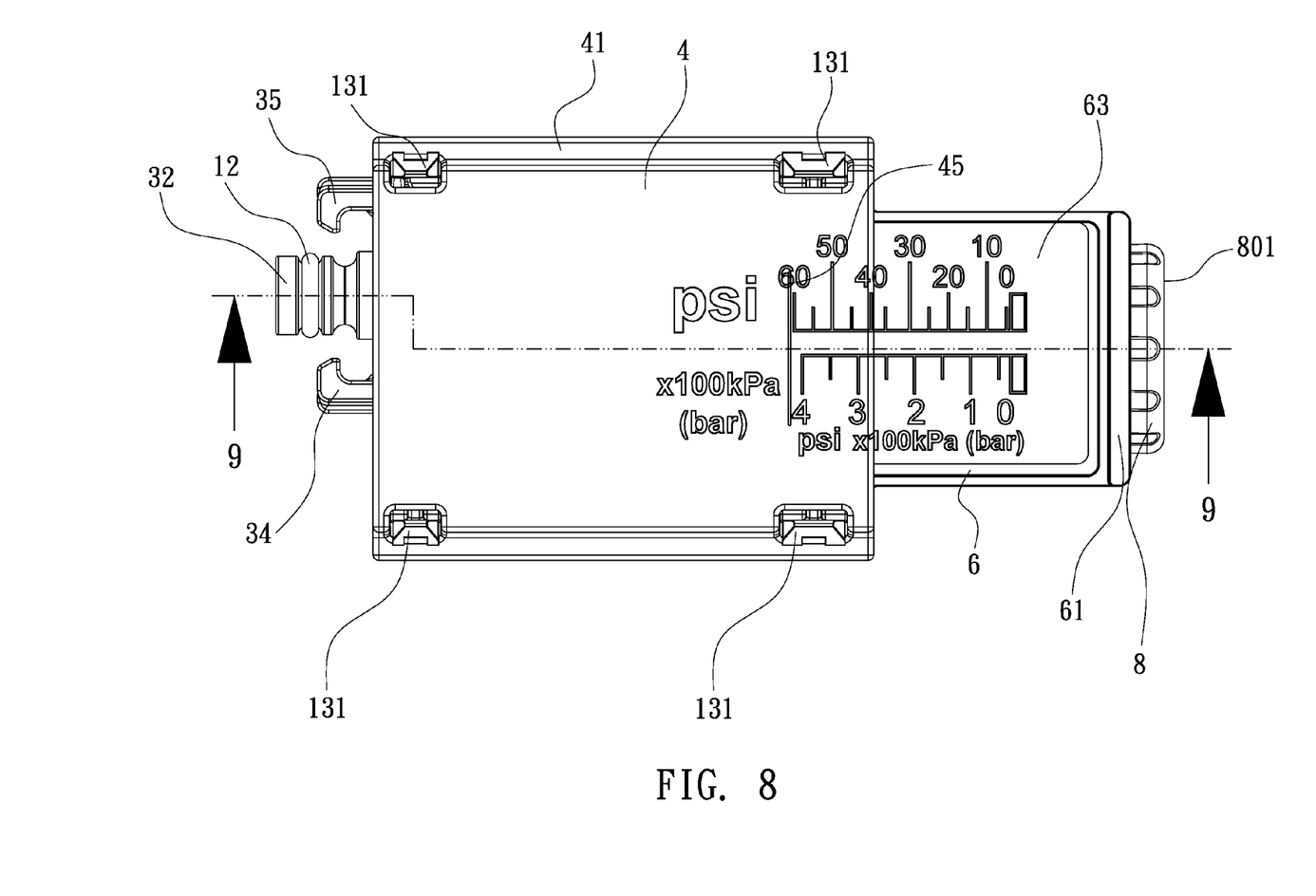
FIG. 8 shows a plan view of the pressure indicator, wherein the slider is moved further by compressed air which exceeds a predetermined pressure.

FIGS. 4 and 5 show a state of the pressure indicator, wherein the air compressor is stopped; namely, the pressure indicator does not receive compressed air from the air storage container 91. When the air compressor is running, as shown in FIGS. 6 and 7, the compressed air stored in the air storage container 8 can flow into the tube 1 via the outlet 92 and the air channel 33 of the connector 32 to force the slider 5 to move towards the open end 21 of the tube 1. The movement of the slider 5 will compress the coiled compression spring 7. According to the pressure-indicating scale 63, the position of the marking line 45 provided on the stationary transparent plate 4, which reflects the pressure of the compressed air within the air storage container 8, can be clearly identified by a user.

Figure 9:
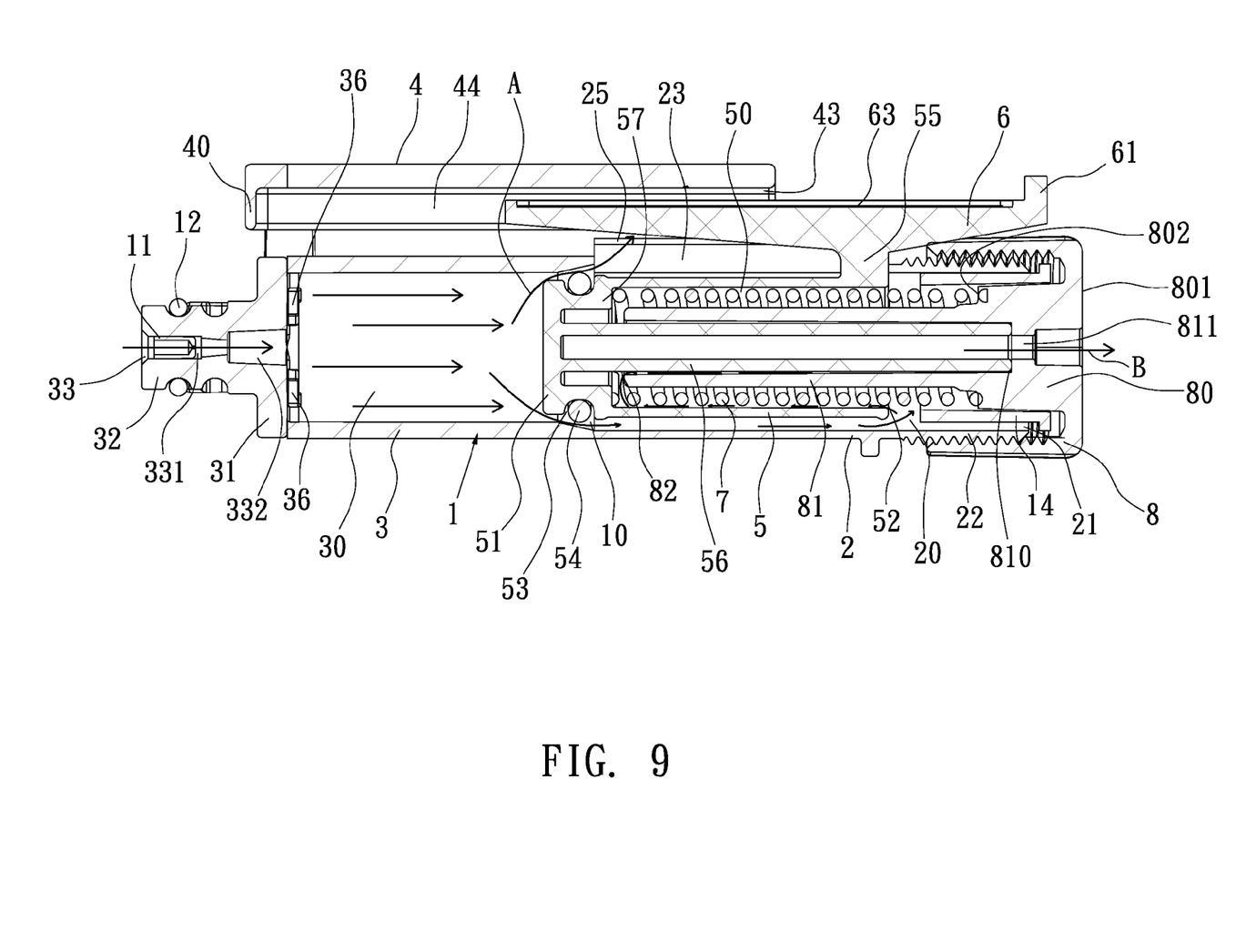
FIG. 9 shows a sectional view of the pressure indicator shown in FIG. 8.

After having completed an operation such as inflating a tire, the air compressor 9 can be stopped. Therefore, the pressure indicator can return to its original state, as shown by FIGS. 4 and 5. Furthermore, in operating the air compressor 9, if the pressure of the compressed air within the air storage container 91 exceeds a permissible pressure set at the air compressor 9, the O-ring 54 can be moved together with the slider 5 to reach the tapered annular surface 10 of the tube 1 (see FIG. 9), and thus an excess of compressed air can flow into the first bore 20 of the first segment 2 via the gap between the O-ring 54 and the tapered annular surface 10 and then flow out of the pressure indicator via the elongated opening 23, as shown by the flow path (A) in FIG. 9. At the same time, an excess of compressed air can sequentially pass through the first bore 20 of the first segment 2, the inner space 50 of the slider 5, the central hole 810 of the central tube 81 of the cap 8, and the vent 811 to be released into the ambient environment, as shown by the flow path (B) in FIG. 9.

In light of the foregoing, the pressure indicator of the present invention can be applied to an air compressor. Particularly, the pressure indicator can be detachably connected to one outlet of an air storage container of the air compressor. The pressure indicator includes a tube provided therein with the tapered annular surface 10, between the first bore 20 and the second bore 30, and defining the elongated opening 23. In operating the air compressor, when the compressed air produced in the air compressor exceeds a predetermined pressure, the compressed air can be released into the ambient environment by way of the elongated opening 23, as shown by the flow path (A), and the vent 811, as shown by the flow path (B). Therefore, the air compressor has no need to be installed with a mechanical safety valve to prevent an object from being overly inflated. Additionally, the pressure indicator, which has a structure different from conventional devices, can measure the pressure of compressed air produced in the air compressor precisely and sensitively. These features render the present invention novel and inventive.

Although the present invention has been described with a certain degree of particularity, it is understood that the present disclosure is made by way of example only and the combination and arrangement of parts may be resorted to without departing from the spirit and scope of the invention hereinafter claimed.

I claim:

1. A pressure indicator for an air compressor, comprising:
   a tube has a first segment and a second segment, the second segment being adapted for connection to one outlet of an air storage container of the air compressor and defining therein a second bore, the first segment being formed integrally with the second segment and having an open end opposite to the second segment and defining therein a first bore that communicates with the second bore, the first bore having a diameter greater than the second bore, a tapered annular surface formed between an inner surface of the first segment, which defines the first bore, and an inner surface of the second segment, which defines the second bore, the first segment defining at its surrounding wall an elongated opening extending from the tapered annular surface to its open end;
   a stationary transparent plate provided with a marking line and detachably fixed onto the tube;
   a slider including a hollow cylindrical body having a closed end and an open end and defining therein an inner space that opens out at the open end, the cylindrical body being provided with a central tube that extends from an inner surface of its closed end , through its inner space, to go beyond the open end, the slider further including a panel that is joined to the hollow cylindrical body through a neck portion that is near the open end of the hollow cylindrical body, such that the panel is parallel to the tube, the hollow cylindrical body being fitted into the tube and the neck portion being inserted through the elongated opening, so that the panel is capable of moving together with the hollow cylindrical body, the panel being provided with a layer of pressure-indicating scale at its outer surface;
   a coiled compression spring fitted into the inner space of the slider, around the central tube of the slider; and
   a cap has an inner base and a central tube extending from the inner base, the central tube of the cap defining therein a central hole, the diameter of the central hole of the central tube of the cap being greater than the external diameter of the central tube of the slider, the external diameter of the central tube of the cap being less than the internal diameter of the coiled compression spring, whereby the compressed air stored in the air storage container can flow into the second bore of the second segment of the tube via the outlet and thus force the slider to move along the second bore and the first bore towards the open end of the first segment of the tube, so that the position of the marking line of the stationary transparent plate relative to the pressure-indicating scale on the panel of the slider can reveal the pressure of the compressed air within the air storage container, and furthermore, when the compressed air exceeds a predetermined pressure set at the air compressor, the compressed air can be released into the ambient environment through the elongated opening.

2. The pressure indicator of claim 1, wherein the second segment of the tube is formed with an end wall opposite to the first segment of the tube, the end wall is provided with a connector and a pair of connection hooks at two opposite sides of the connector, the connector defining therethrough an air channel communicating with the second bore of the second segment of the tube, the outlet of the air storage container being provided with a flange, the connection hooks being engaged with the flange of the outlet of the air storage container while the connector being inserted into the outlet by turning the tube in a forward direction, whereby the pressure indicator can be connected to the air compressor to allow the compressed air to flow into the tube; the connection hooks being disengaged from the flange of the outlet of the air storage container while the connector being removed from the outlet of the air storage container by turning the tube in a reverse direction.

3. The pressure indicator of claim 2, wherein the tube is provided at the open end of the first segment with external threads and provided at its surrounding wall with four fixing aims, each fixing aim being provided with a snap-fitting hook at its end, and the stationary transparent plate defines four openings corresponding to the snap-fitting hooks of the fixing aims, whereby the stationary transparent plate can be detachably fixed onto the tube by inserting the snap-fitting hooks into the openings of the stationary transparent plate.

4. The pressure indicator of claim 3, wherein the closed end of the hollow cylindrical body of the slider is formed with an inner step around the central tube of the slider; an annular inner surface is formed between the central tube of the cap and the inner base of the cap; a sleeve is fitted around the inner base of the cap; wherein the cap is threadedly mounted to the tube, a first end of the coiled compression spring being urged against the inner step of the closed end of the slider, a second end of the coiled compression spring being inserted into the sleeve and urged against the annular inner surface between the inner base and the central tube of the cap.

5. The pressure indicator of claim 3, wherein the stationary transparent plate is a generally rectangular structure that defines at its back surface a recessed space being parallel to the tube and has a sidewall at its left side; the panel has a sidewall at its right side and is provided with a plurality of protrusions on its top and bottom sides, the panel of the slider capable of moving along the recessed space of the stationary transparent plate, wherein the sidewall of the stationary transparent plate 4 is adjacent to the left side of the panel whereas the sidewall of the panel is adjacent to the right side of the stationary transparent plate when the air compressor is stopped, and the protrusions of the panel contacts two opposing side surfaces of the recessed space to facilitate the movement of the panel.

6. The pressure indicator of claim 5, wherein the hollow cylindrical body of the slider defines an annular groove at its surrounding wall, near its closed end, to be fitted with an O-ring, whereby when the compressed air exceeds a predetermined pressure set at the air compressor, the O-ring will be moved together with the slider to reach the tapered annular surface of the tube, so that the compressed air can pass through the gap between the tapered annular surface and the O-ring to enter the first bore of the first segment and then pass through the elongated opening to be released into the ambient environment.

7. The pressure indicator of claim 2, wherein the air channel is composed of a small-diameter channel and a large-diameter channel, the small-diameter channel being fitted with a buffering plug to moderate instantaneous pressure surge of the compressed air transferred from the air compressor, the large-diameter channel being adjacent to the second segment of the tube.

* * * * *